Figures 1, 2:
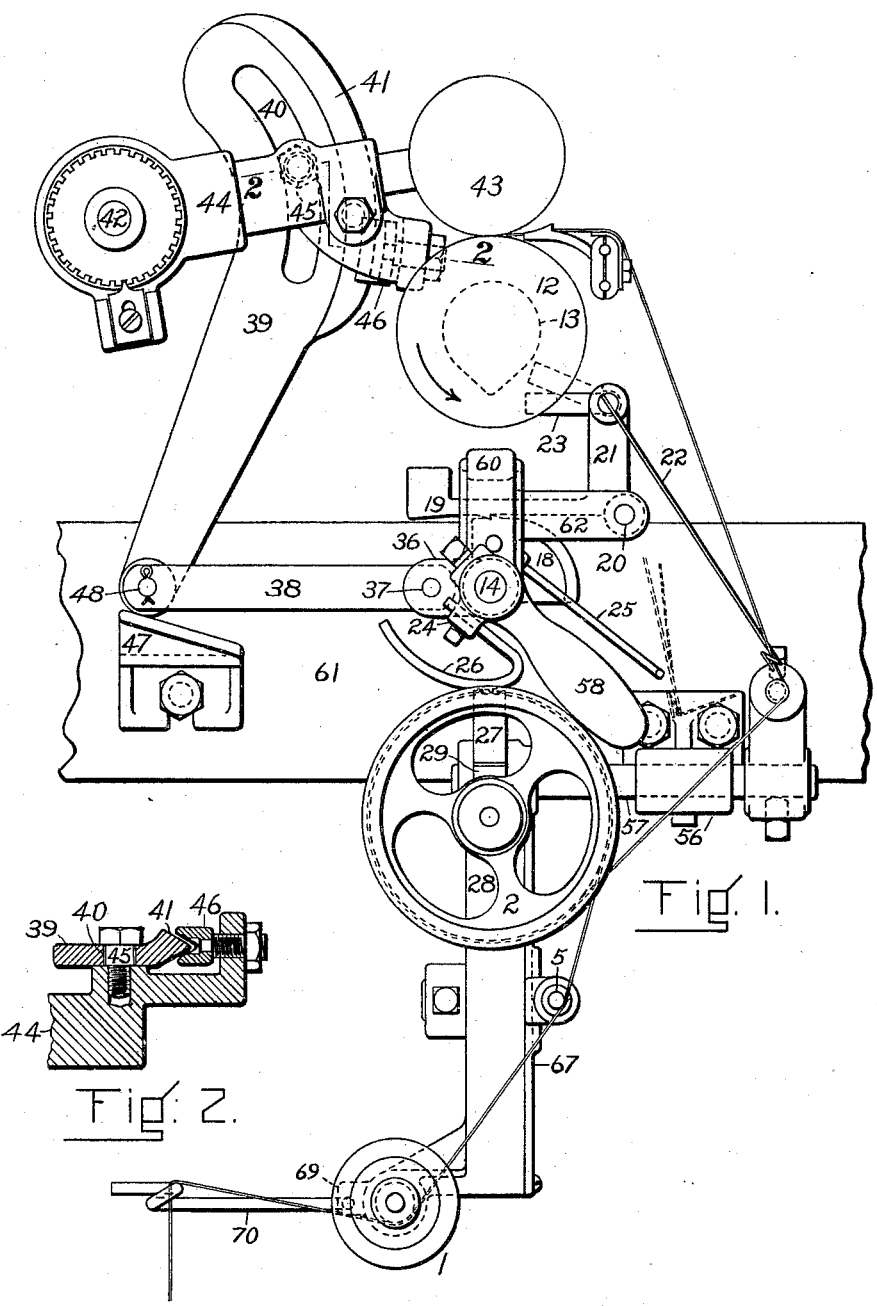

G. W. FOSTER.
WARP WINDING AND MEASURING MACHINE.
APPLICATION FILED SEPT. 7, 1909.

1,005,823.

Patented Oct. 17, 1911.

2 SHEETS—SHEET 1.

WITNESSES
Channing Whitaker.
Irving D. Kimball

INVENTOR
George W. Foster.

G. W. FOSTER.
WARP WINDING AND MEASURING MACHINE.
APPLICATION FILED SEPT. 7, 1909.

1,005,823.

Patented Oct. 17, 1911.
2 SHEETS—SHEET 2.

WITNESSES
Channing Whitaker.
Irving D. Kimball

INVENTOR
George W. Foster.

UNITED STATES PATENT OFFICE.

GEORGE W. FOSTER, OF LOWELL, MASSACHUSETTS.

WARP WINDING AND MEASURING MACHINE.

1,005,823.    Specification of Letters Patent.    Patented Oct. 17, 1911.

Application filed September 7, 1909. Serial No. 516,449.

*To all whom it may concern:*

Be it known that I, GEORGE W. FOSTER, of Lowell, in the county of Middlesex and the Commonwealth of Massachusetts, have invented certain new and useful Improvements in Warp Winding and Measuring Machines, of which the following description and claims, with the accompanying drawings, is a specification.

This invention relates to winding-machines, combined with measuring-instruments, more particularly to the general type of winding-machines which includes my United States Patent #813,372, combined with other parts which may be embodied in an accurate measuring-and-severing attachment, embodying a material-actuated measuring-wheel, which can be manufactured and sold independently of the machine, and which can be aplied to and removed from the machine at pleasure.

The invention comprises improvements: in the means for engaging and disengaging the material-carrier and the roll in the winding-machine; in the means for positioning the drop-wire for rethreading in the winding-machine; in means for braking the measuring-wheel upon the parting of the material and for releasing the wheel from the brake when the material is positioned for measuring in the machine; in the means for measuring the material and for severing it whenever the predetermined length thereof but no more has passed the severing-means and which does not require that the measuring-wheel shall be set at the beginning of each measurement of a predetermined length; and, various combinations of parts which will be hereinafter particularly described, pointed out, and distinctly claimed.

The details of construction can be varied without departing from my invention.

Like figures in the drawings denote like parts.

Figures 3, 5:
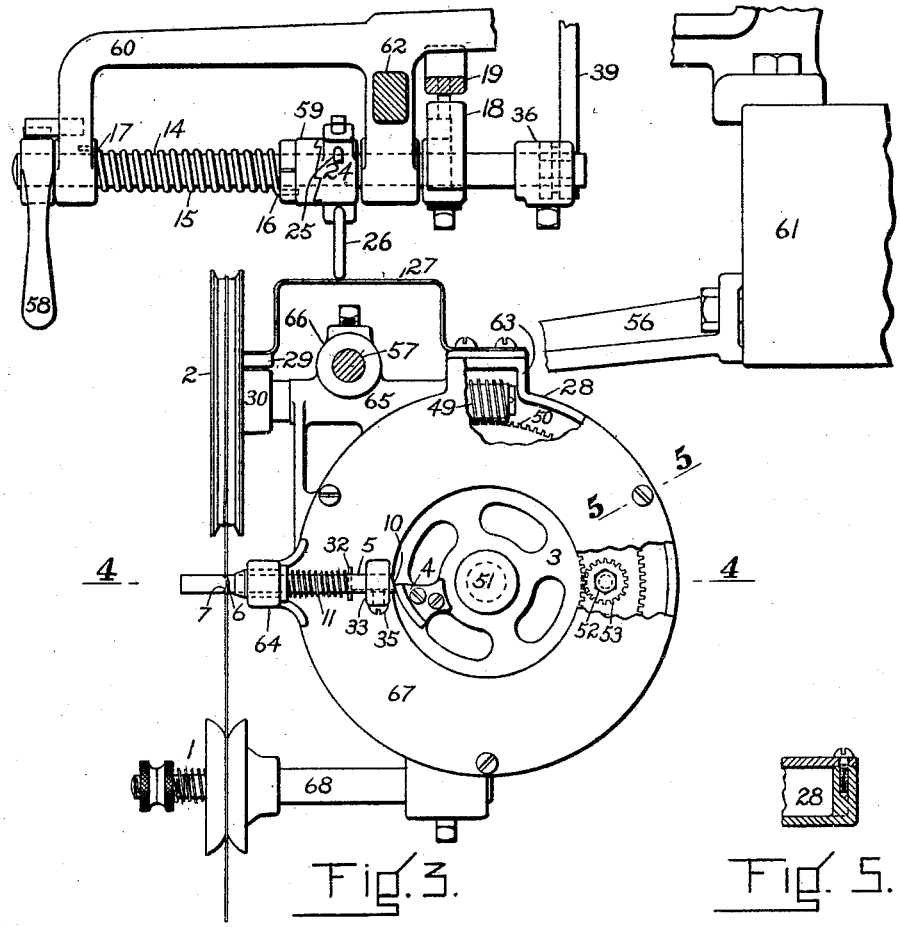
Figure 4:
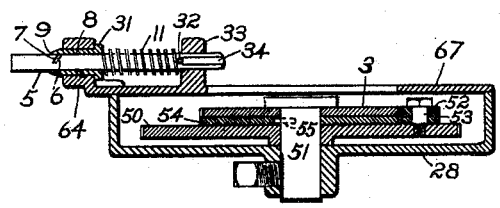

In the drawings: Figure 1 is a front elevation of the parts of a winding-machine and of the attachments therefor, in which my inventions are embodied in their preferred form; Fig. 2 is a section, taken on line 2—2 of Fig. 1; Fig. 3 is a side-elevation of the principal parts, with certain parts removed; Fig. 4 is a section, taken on line 4—4 of Fig. 3, showing, particularly, parts of the reducing-mechanism and parts of the severing-means; and, Fig. 5 is a section, taken on line 5—5 of Fig. 3.

The preferred mechanism for longitudinally moving the material comprises a rotatably-mounted material-carrier 43 and a power-driven driving-roll 12. Two rotatable disks constituting the guiding-and-tension device 1 are pressed toward one another by a thumb-nut-controlled spring whereby the material is guided toward, held back from, and made to grip the measuring-wheel 2. These parts are as is usual. The slider 5 is peculiar to my invention. It is one of two guides which coöperate to cause the material to contact with the wheel and has a severing-edge which will be more particularly described hereinafter. In my invention the slipping of the material upon the periphery of the wheel while the material remains whole is a neglible quantity. It is peculiar to my invention that I make the measuring-wheel therein a change-wheel. Whenever a change is to be made in the predetermined length that is to be repeatedly measured the wheel 2 is removed from its shaft and a different wheel having a perimeter of the required different length is substituted therefor. The wheels are only infrequently changed and by skilled-mechanics who make few mistakes. A positively-reducing mechanism intermediate the wheel and a severing means to be described comprises a worm 49 constructed to rotate with the wheel which actuates a toothed-gear 50 rotatably-mounted upon a stud 51. Fastened to the gear 50 is a stud or pivot 52. The toothed planet-wheel 53 is rotatably mounted on the pivot and co-acts with the toothed sun-wheels 3 and 54 which differ from one another by one in the number of their teeth. 54 is fastened to the stud 51 while 3 is rotatably mounted upon it. A wiper 4, a small portion of a cylinder eccentrically fastened upon the rotatable sun-wheel, co-acts with the slider 5: to slowly compress and energize the spiral-spring 11 mounted upon the slider, by power transmitted from the driving-roll through the material, the wheel, and the reducing-mechanism; and, when the wheel has made the predetermined number of rotations, to release the severing-means.

The method of operation of the machine is as follows: The machine being threaded and its parts positioned as represented in Figs. 1 and 3, the material passes from a bobbin, not shown, through the pig-tail 70 and the guiding-and-tension device 1 to the slider 5 where its direction is changed. This change of direction causes the material to press against the slider 5. The material then almost completely encircles the measuring-wheel 2, turns through almost a right-angle about a hardened steel stud, shown but not numbered in Fig. 1, passes through the loop of the drop-wire 22, and through the thread-guide, shown but not numbered in Fig. 1, which guide lays the material upon the carrier 43. If the material breaks or is severed, the drop-wire 22 falls, the striker 13 strikes the bunter 23, rotates the lever-arm 21 and the detent 19 about the pivot 20 in the direction of motion of the hands of a watch, if viewed as in Fig. 1. This movement of the detent releases the ratchet 18 that is fastened upon the shaft 14. That shaft, under the influence of the spring 15, snaps around through about ninety degrees in a direction opposite to that of the motion of the hands of a watch, if viewed as seen in Fig. 1. The shaft 14 carries with it the wire-cam 26 which bears hard against and bends the brake-spring 27, and forces the brake-shoe 29 hard against the hub 30 of the measuring-wheel 2, stopping the wheel at once. The shaft 14 carries with it the return-lever 25, which positions the drop-wire 22 for re-threading and retains it in position until the winding begins again. The shaft 14 carries with it the crank-pin 37, and by a method of operation hereinbefore described, causes the material-carrier 43 to be elevated out-of-contact with the driving-roll 12 by a rotation about the stud 42. Thus the breaking or severing of the material is at once followed by the dropping of the detector 22. That dropping is followed, simultaneously, by the disengaging of the carrier 43 from the roll 12, the braking of the measuring-wheel 2, and the positioning for re-threading of the detector 22. Upon the re-securing of the thread to the carrier 43, the tightening of the thread in the machine, and the turning through about ninety degrees in the direction of motion of the hands of a watch, as viewed in Fig. 1, of the hand-lever 58, which is fastened upon the shaft 14, the detent 19 again retains parts of the machine in the positions of Figs. 1 and 3 with the spring 15 energized by hand-power to repeat its already described work, with the carrier in engagement with the constantly rotating roll, and with the material tightly gripping the wheel for its rotation. As the wiper 4 passes the end of the slider 5, the spring 11, threaded upon the slider, automatically and quickly shoots the slider inward, causing the cutting edges 7 and 9 to sever the material. The detector 22 then falls, with the results which have already been described, and with the measuring-wheel 2 at the zero-point. The material is now doffed from the carrier 43. The formation of a material-load of the predetermined length begins when the carrier is without load and the measuring-wheel is at the zero-point upon the re-threading of the machine and the throwing of the hand-lever 58 in the right direction. The reducing-mechanism, whereby the measuring-heel 2 actuates the wiper 4, is positive, the material, when under proper tension, will not slip upon the wheel, and if the operative pieces-up the ends, when they break, by the hereinbefore described method, the material-load will have the predetermined length when next the cutting-edges 7 and 9 sever the material. While the material-load is being wound, the power, acting through the material, the measuring-wheel, and the reducing-mechanism hereinbefore described, energizes the spring 11.

The slider 5 of the severing-means, is of round steel wire. Its inner end is inclined at 10 to conform to the shape of the wiper, which is in contact with, slides upon, and passes that end during a portion of each periodic-motion or rotation of the wiper. The slider has a cross-groove 6, and a cutting edge 7 at the intersection of a surface of the groove and the cylindrical-surface of the slider. The cross-groove is inclined toward the direction of motion of the slider, with the deepest part of the groove trailing behind the most superficial part thereof while the slider moves in the direction to sever the material. This inclination of the groove tends to carry the material to the bottom of the groove while the material is being severed. So much of the slider as reciprocates in its inner bearing is flattened upon one side at 34 and its flat surface 34 contacts with flat-ended screw 35 inserted through the walls of that bearing. The coöperation of the screw with the flat surface 34 prevents the rotation of the slider; limits the back-lash or rattling of the slider at its inner support; and, contributes to the accuracy with which the slider responds to its release by the wiper to sever the material while the wiper is in the same identical phase of each of its rotations. The outer guide-bearing 8 for the slider is a steel pipe-box, having a cutting-edge 9 at the intersection of the outer end of its cylindrical bearing-surface with the outer end of the box, and having a flanged collar 31 at the inner end thereof. The pipe-box 8 is simply slipped into a hole drilled for it in the stand. It is retained in place by the spiral-spring 11 threaded upon the slider, pressing against the collar of the pipe-box by one of its ends, and pressing against a stop-pin 32 in the slider by its other end. When the spring is least tense, the stop-pin bears against the inner support for the slider 33 and the groove is wholly within the bearing of the pipe-box 8. The cutting-edges 7 and 9 coöperate in severing the material. The wiper 4 by its action upon the inclined end of the slider pushes the slider outward, compressing the spring 11 and carrying the groove 6 into the path of motion of the material. The material then drops into the groove and runs therein, until the wiper 4 passes out-of-contact with the inclined surface 10 of the slider. This passing out-of-contact always occurs when the wiper 4 is in the same phase of its rotation. The spring 11 then automatically and quickly shoots the slider inward, causing the cutting-edges 7 and 9 to sever the material, and returns the slider to its inner position where it remains with the groove 6 within the pipe-box 8 until the wiper again begins to energize the spring. The mechanism which includes: the measuring-wheel; the worm-and-gear, sun-and-planet wheel, reducing-mechanism; and, the wiper is a positive-mechanism. It is because this said mechanism is positive, and, because the automatic severing-means acts suddenly and with abundant power that the severing-means is sure to sever the material when the measuring-wheel has made the predetermined number of rotations.

A positive material-actuated measuring-reducing-energizing-releasing-and-severing mechanism is a feature peculiar to my invention. When this mechanism is positive, but not otherwise, the releasing of the severing-means must occur at once upon the completion of the predetermined number of rotations of the wheel. If the material remains whole during the predetermined number of rotations of the wheel, the material will not slip with respect to the wheel, and, when the material remains thus whole, when this mechanism is positive, and when the automatic severing-means is efficient, the material will be severed at once upon the completion of the passage of the predetermined length of material past the severing-means. There are examples in the prior art of such measuring-and-indicating mechanisms as require that the operative shall set the indicator at the zero-point at the beginning of the measurement of each length which is to form a separate package. To make it easy for the operative to thus set the indicator, a slip-friction-clutch, or its equivalent, is introduced into the mechanism between the wheel and the indicator. Sometimes, a spring-pressed pin or other brake increases the resistance to the movement of the part of the mechanism that is driven through the slip-friction-clutch. Whenever an easily-slipping slip-friction-clutch intervenes between the wheel and a severing-means that is actuated by that wheel, it makes the severed length uncertain, and, especially so, if a brake increases the resistance of the clutch-driven parts. The easier such a clutch slips, the easier it will be for the operative to set the indicator at the zero-point. If the clutch slips, the severed length will be greater than the intended length. My invention relieves the operative from the necessity and trouble of setting the indicator at any time, and advances the interests of the manufacturer by enabling him to always furnish to his customer, with an accuracy which is a new result in the art, the expected length of material without adding thereto a variable and unascertainable excess length for which he will receive no compensation.

*The starting-and-stopping motion.*—It is desirable to break the material at its weak places and to re-unite the broken material in a workmanlike manner, as it passes through the machine of my invention, to reduce the labor-cost of subsequent processes of the manufacture. Preferably, I use, as a part of the starting-and-stopping motion of my invention, a starting-and-stopping motion of the type of that of my United States Patent No. 813,372, but I add new elements and give new functions to the older invention. The cam-like striker 13 projects from the rear-end of the driving-roll 12 and rotates rapidly in a circular path. The starting-and-stopping shaft 14 makes a right-angle with that path and is conveniently located near to and below the driving-roll. The starting-lever 58 is fastened thereto and can rotate through about one quarter of a turn between stops. A spiral-spring 15 is threaded upon the shaft. It is fastened by its inner end 16, through a ratchet-collar 59, to the shaft 14 and by its outer end 17 to a stand 60 fastened to the roller-beam 61. A ratchet 18 is fastened to the shaft 14 near its inner end. The weighted-detent 19 is pivotally mounted at 20 upon the arm 62 of the stand 60. It coöperates with the ratchet 18 and prevents the uncoiling of the tensely energized spring 15 while the material grips the measuring-wheel. Pivotally mounted upon the lever-arm 21 of the detent 19 is the drop-wire 22 having a suitable thread-eye whereby it rides upon the material touching it between the measuring-wheel and the package-holder with so delicate a pressure as not to endanger the weakest thread. The maximum energy which it can exert by dropping suddenly through its extreme movement is far too trivial to cause the simultaneous stopping of the mutual advance of the material and the measuring-surface. To cause such stopping it is necessary to overcome the frictional resistance caused by the pressure of the tensely-energized spring 15 between the teeth of the ratchet 18 and the detent 19. I invoke the driving-power to overcome the said friction and to release the automatic stop-motion. The drop-wire 22 and the bunter 23 make a little more than a right-angle with each other. They are fastened to the same short pivotal shaft and rotated together. During the winding, the material positions both the drop-wire and the bunter and keeps the bunter out of the path of the striker 13. Unless the material breaks or is severed, it will not lose its grip on the wheel. If it breaks or is severed, the bunter will move in the direction of a tangent to the path of the striker. The speed of the driving-roll 12 and of the striker 13 may equal 1200 revolutions per minute. Within a fraction of the time of a revolution of the power-driven striker, it will push the bunter in the direction thereof and rotate the lever-arm 21 and the detent 19 about the pivot 20 in the direction of rotation of the hands of a watch. The spring 15 will immediately uncoil through about ninety (90) degrees and, by two different subordinate mechanisms, simultaneously stop the advance of the material and of the wheel. In a winding-machine combined with a positive material-actuated measuring-instrument constructed to sever the material whenever a predetermined length thereof but no more has passed the severing-means and which does not require that the wheel shall be set at the beginning of each measurement of a predetermined length, precise accuracy will not be had: if after the breaking or severing of the material, the wheel shall continue to run from the momentum of its parts without being actuated by the material; or, if, after attaching the material to the carrier, the carrier shall be revolved while the material is too slack to actuate the wheel. In my invention: the corresponding advance movements of the material and of the wheel start simultaneously upon the throwing of the starting-lever by the operative, after the broken end has been properly secured to that upon the carrier with material derived from the supply, or, after the severed end has been secured to an empty carrier, and, in either case, after the material has been sufficiently drawn back through the guiding-and-tension device 1 to cause the material to grip the wheel; those corresponding advance movements stop simultaneously either with the breaking or the severing of the material; and, the material and the wheel remain without advance or recession between the stopping and the starting. It is thought that the prior art has no example of a starting-and-automatic-stopping mechanism, acting upon the movement into a particular position of a delicate element propelled by very slight energy, but which invokes powerful energy derived from another source that simultaneously starts and automatically and simultaneously stops both the wheel and the longitudinal advance of the material. In my invention, I have constructed a stopping-and-starting mechanism, whereby, the throwing of a starting-lever energizes an element of the starting-and-stopping mechanism, and, upon the breaking or severing of the material, parts of my invention release the stopping mechanism to permit such energized element, by virtue of the stored energy, to automatically and simultaneously stop the corresponding advance of the material and the wheel, and the said starting-and-stopping mechanism prevents the advance of either the material or the wheel out-of-correspondence with the other. I believe that this is a new and useful advance of the art, and that it adds the last touch of accuracy and efficiency to my machine for longitudinally moving, measuring, and severing an elongated flexible material into predetermined lengths. In my invention, the automatic severing of the material occurs when, and only when, the measuring-instrument is at its zero point and the measuring of the predetermined length has been completed. The measuring-instrument is immovable from the instant of such severing until that of throwing the starting-lever. It is never necessary to set my measuring-instrument at the zero-point at the beginning of the measurement of a predetermined length.

Fastened to the starting-and-stopping-shaft is a collar 24 that carries a wire return-lever 25 and a brake-cam 26, also of wire for lightness and cheapness. The brake-cam 26 is out-of-action, during the advance of the material, but touches a flat-steel-spring 27 that is fastened by its inner end, to the casing 28; and, by its outer-end, to the brake-shoe 29 for contacting with the hub 30 of the wheel. When the power releases the stop-motion, the released energy of the spring 15 crowds the rotatable-cam 26 hard against the brake-spring 27 and the brake-shoe 29 hard against the hub 30. The brake stops the wheel instantly. When the starting-lever 58 is thrown to energize the spring 15, the brake-spring 27 lifts the brake-shoe 29 out-of-contact with the hub of the wheel.

The return-lever 25 has a horizontal part of some length at its outer-end; is out-of-action during the advance of the material; and, when the power releases the stop-motion, it springs into touch with the drop-wire and positions it for re-threading. Fastened to the inner-end of the starting-and-stopping-shaft 14 is a crank-arm 36 having a crank-pin 37. A connecting-rod 38 links it with the slotted-link 39. The slot 40 and the V 41 of the link 39 are concentric. The material-carrier 43 is rotatably mounted upon the package-carrier-arm 44 which is pivotally mounted upon the stud 42 and carries the stud 45 and the saddle 46. While the material is advancing, the material-carrier 43 rests upon and is driven by the winding-drum 12; the slotted-link 39 is supported upon the bracket 47 and positioned at its pivot 48 by the connecting-rod 38; the slot 40 and the V 41 are concentric with the stud 42; the material-carrier 43 gradually increases in diameter; the package-carrier-arm gradually rises; the stud 45 slides in the slot 40; the saddle 46 slides with respect to the V 41; and, the connecting-rod 38 and the crank-arm 36 are in substantially the same straight line. When the power releases the automatic-stopping motion, the released energy of the spring 15 transmitted through the shaft 14 suddenly rotates the crank-arm 36 through about ninety (90) degrees; the connecting-rod 38 drags the slotted-link pivot 48 toward the shaft 14, changing the direction of the link; the upper part of the slotted-link 39 is gripped between the stud 45 and the saddle 46; and, in the endeavor to bring the stud 42, the pivot 48, and the crank-pin 37 into line, elevates the link 39, the arm 44, and the material-carrier 43, separates the holder and package from the drum 12, and stops the winding and the longitudinal advance movement of the material. When the starting-lever 58 is thrown to energize the spring 15, the material-carrier 43 returns into driving-connection with the winding-drum 12 and the longitudinal advance of the material instantly begins again.

There are certain parts of my invention, which for convenience in manufacturing, selling, applying to and removing from a machine that embodies other parts thereof, I may mount upon a casing. I provide the casing with means for attaching it to the machine. By combining the casing with these certain parts a new and useful article is produced which may be independently manufactured and sold.

The casing is shown in Figs. 1, 3, 4, and 5. It is a box-like structure having a body 28 with a removable lid 67 screwed thereto. It incloses most of the reducing-motion and aids in keeping it and the material clean. It has: a central, set-screwed hub in which the stud 51 is fastened; a hollow projecting-portion 63, which incloses the worm 49 and is the place of attachment of the spring 27; a set-screwed hub for the stud 68 for the support of the guiding-and-tension device 1; a set-screwed hub 69 for the support of the pig-tail 70; two stands 64 and 33 integral with its cover 67 for the slider 5 of the severing-means; and, a substantial bracketed-stand 65 for the long pipe-bearing of the shaft of the wheel and for the support of the set-screwed hub 66 which is for conveniently attaching the casing to or removing it from the shaft 57. All of these minor parts that are not integral with the cover are integral with the body of the casing.

The shaft 57 is a permanent part of the machine for longitudinally advancing the material and is set-screwed into the hub of the stand 56 that is screwed to the top-beam 61 of the machine. The principal attachment comprises: the casing; the measuring-and-indicating-mechanism; the brake-spring 27; and, the brake-shoe 29. A subordinate attachment, which goes with the principal one but is not secured to it, comprises: the collar 24, having means for fastening thereto the return-lever 25, and having means for fastening thereto the brake-cam 26; and, the brake-cam 26.

I claim—

1. The combination with the driving-roll of a winder, a material-carrier driven thereby, a material-actuated measuring-wheel, and means for directing the material to and for causing it to grip the wheel, of means for simultaneously engaging the carrier and the roll and starting the wheel.

2. The combination with the driving-roll of a winder, a material-carrier driven thereby, a material-actuated measuring-wheel, and means for directing the material to and for causing it to grip the wheel, of means for simultaneously engaging the carrier and the roll, starting the wheel, and energizing the means for disengaging the carrier and the roll and braking the wheel.

3. The combination with the driving-roll of a winder, a material-carrier driven thereby, a material-actuated measuring-wheel, and means for directing the material to and for causing it to grip the wheel, of means for simultaneously disengaging the carrier and the roll and braking the wheel.

4. The combination with the driving-roll of a winder, a material-carrier driven thereby, a material-actuated measuring-wheel, means for directing the material to and for causing it to grip the wheel, a detector for slackness of the material, and means for simultaneously disengaging the carrier and the roll and braking the wheel, of means for positioning the detector for contacting with the material.

5. The combination with the driving-roll of a winder, a material-carrier driven thereby, a material-actuated measuring-wheel, means for directing the material to and for causing it to grip the wheel, automatic means for severing the material, and positive measuring-wheel-actuated means for energizing the severing-means.

6. The combination with the driving-roll of a winder, a material-carrier driven thereby, a material-actuated measuring-wheel, means for directing the material to and for causing it to grip the wheel, automatic means for severing the material, and positive measuring-wheel-actuated means for releasing the severing-means.

7. The combination with the driving-roll of a winder, a material-carrier driven thereby, a material-actuated measuring-wheel, means for directing the material to and for causing it to grip the wheel, automatic means for severing the material, positive measuring-wheel-actuated means for energizing and for releasing the severing-means, and means for simultaneously disengaging the carrier from the roll and braking the wheel.

8. The combination with the driving-roll of a winder, a material-carrier driven thereby, a material-actuated measuring-wheel, means for directing the material to and for causing it to grip the wheel, means for detecting slackness of the material, automatic means for severing the material, positive measuring-wheel-actuated means for releasing the severing-means, and means acting upon the displacement of the detector for simultaneously disengaging the carrier from the roll and braking the wheel.

9. The combination with the driving-roll of a winder, a material-carrier driven thereby, a material-actuated measuring-wheel, and means for directing the material to and for causing it to grip the wheel, of: a rotatable gear in positive toothed-gear connection with the wheel, for making a single rotation during a predetermined number of rotations of the wheel; an automatic severing-means; and, means fastened to the gear for energizing the severing-means.

10. The combination with the driving-roll of a winder, a material-carrier driven thereby, a material-actuated measuring-wheel, and means for directing the material to and for causing it to grip the wheel, of: a rotatable gear in positive toothed-gear connection with the wheel, for making a single rotation during a predetermined number of rotations of the wheel; an automatic severing-means; and, means fastened to the gear for releasing the severing-means in the same phase of each rotation of the gear.

11. The combination with the driving-roll of a winder, a material-carrier driven thereby, a material-actuated measuring-wheel, and means for directing the material to and for causing it to grip the wheel, of: a reducing-mechanism comprising a worm fastened to rotate with the measuring-wheel and in toothed connection with a worm-gear rotatably mounted upon a stud and carrying a pivot upon which is rotatably mounted a planet-wheel in toothed-gear-connection with two sun-wheels which differ from one another by one in the number of their teeth, one sun-wheel being fixed upon the stud and the other being rotatably mounted thereon; and, a wiper fastened to the rotatably-mounted sun-wheel.

12. The combination with the driving-roll of a winder, a material-carrier driven thereby, a material-actuated measuring-wheel, and means for directing the material to and for causing it to grip the wheel, of: a rotatably-mounted wiper; a reducing-mechanism intermediate the wheel and the wiper; a wiper-actuated slider, having a cross-groove a surface of which intersects the principal surface of the slider in a cutting-edge; a slider-bearing, the bearing surface of which intersects an end-surface thereof in a cutting-edge for co-acting with the cutting-edge of the slider; and, a spiral-spring, threaded upon the slider and contacting with the slider-bearing by one end and with a projection from the slider by the other end.

13. The combination with the driving-roll of a winder, a material-carrier driven thereby, a material-actuated measuring-wheel, and means for directing the material to and for causing it to grip the wheel, of: a rotatably-mounted wiper; a reducing-mechanism intermediate the wheel and the wiper; a wiper-actuated slider, having: a circular cross-section throughout most of its length; an inclined end; a flat surface throughout a part of its length near the inclined end; and, a cross-groove near the opposite end, making an acute angle with the part of the axis of the slider that lies toward the inclined end of the slider, and having a surface which intersects a cylindrical surface of the slider in a cutting-edge; a slider-bearing of annular cross-section, having a bearing-surface that intersects an end-surface thereof in a cutting-edge for co-acting with the cutting-edge of the slider, and having a flange at the opposite end; a spiral-spring, threaded upon the slider and contacting with the bearing-flange by one end and with a pin through the slider by the other end; and, an adjusting-screw, mounted in the slider-bearing near the inclined end of the slider for co-acting with the flat surface of the slider.

14. An attachment for a winder having a driving-roll and a material-carrier driven thereby, comprising in combination therewith: a casing, having means which permit its attachment to and its removal from the winder and having mounted thereupon: a material-actuated measuring-wheel; a wheel-actuated positive reducing-motion carrying a wiper; an automatic severing-means; a brake-spring and shoe for braking the wheel; and, means for directing the material to and for causing it to grip the wheel.

15. An attachment for a winder having a driving-roll and a material-carrier driven thereby, comprising in combination therewith: a separable casing having: a body for protecting a reducing-mechanism; means which permit the attachment of the casing to and its removal from the winder; a stand for a bearing for the shaft of a measuring-wheel; a hub for fastening the principal stud of a reducing-mechanism therein; a projecting-portion for inclosing a worm of a reducing-mechanism and for a place of attachment for a brake-spring; a hub for a stud for supporting means for directing the material to and for causing it to grip the wheel; a hub for a pig-tail; and, a cover, removably fastened to the body and having a stand integral therewith for a bearing for a severing-means.

16. The combination with the driving-roll of a winder and a material-carrier driven thereby of means for engaging and disengaging the carrier and the roll comprising: a pivotally-mounted arm upon which the carrier is mounted and which has a projection and a saddle; and, a link slotted to receive the projection, having a part for co-acting with the saddle, and having the slot and the part concentric with the pivot of the arm while the roll and the carrier are engaged but so located as to disengage the carrier from the roll when the link is moved in the direction to grip the projection and the saddle.

17. The combination with the driving-roll of a winder and a material-carrier driven thereby of means for engaging and disengaging the carrier and the roll comprising: a pivotally mounted arm upon which the carrier is mounted and which has a projection and a saddle; a link slotted to receive the projection, having a V-shaped part for co-acting with the saddle, and having the slot and the V-shaped part concentric with the pivot of the arm while the roll and the carrier are engaged but so located as to disengage the carrier from the roll when the link is moved in the direction to grip the projection and the saddle; and, a stand for supporting the link while the carrier and the roll are engaged.

18. The combination with the driving-roll of a winder and a material-carrier driven thereby of means for engaging and disengaging the carrier and the roll comprising: a disk; means for turning it; a detent with means to hold it from turning; a striker carried by the driving-roll; and, a drop-wire rotatably mounted upon the detent, having a bunter fastened thereto, and constructed to swing into the path of the striker to be struck by it and thereby to release the detent upon the falling of the drop-wire.

19. The combination in a winding machine of a disk; means for turning it; a detent with means to hold it from turning; a drop-wire rotatably mounted on the detent; a pivot-arm and pivot mounted to turn with the disk; and, a lever rotatably mounted on the pivot for positioning the drop-wire for rethreading.

20. In combination with a material-actuated measuring-wheel, means for braking the wheel upon the parting of the material and for releasing the wheel comprising: a cam rotatably mounted; means for rotating it; a flat-spring brake-arm, fixed at one end; and, a brake-shoe attached to the other end for co-acting with the measuring-wheel.

21. The combination with the driving-roll of a winder and a material-carrier driven thereby of a material-actuated measuring-wheel and means for braking the wheel upon the parting of the material and for releasing the wheel comprising: a cam rotatably mounted; means for rotating it; a flat-spring brake-arm, fixed at one end; and, a brake-shoe attached to the other end for co-acting with the measuring-wheel.

22. In combination with a material-actuated measuring-wheel means for severing the material upon the passage of a predetermined length thereof comprising: a reducing-mechanism comprising a part for making a single rotation during a predetermined number of revolutions of the wheel; a wiper mounted upon the part; a wiper-actuated slider-and-guide for the material, so located as to change the direction of the material in a plane of rotation of the wheel and having a cross-groove a surface of which intersects the principal surface of the slider in a cutting-edge; a slider-bearing the bearing-surface of which intersects an end-surface thereof in a cutting-edge for co-acting with the cutting-edge of the slider; and, a spiral-spring threaded upon the slider and contacting with the slider-bearing by one end and secured to the slider by the other end for causing the severing of the material by the cutting-edges.

23. The combination with the driving-roll of a winder, a material-carrier driven thereby, a guiding-and-tension device, and a material-actuated measuring-wheel of means for severing the material upon the passage of a predetermined length thereof comprising: a reducing-mechanism comprising a part for making a single rotation during a predetermined number of revolutions of the wheel; a wiper mounted upon the part; a wiper-actuated slider-and-guide for the material so located as to change the direction of the material in a plane of rotation of the wheel and having a cross-groove a surface of which intersects the principal surface of the slider in a cutting-edge; a slider-bearing the bearing surface of which intersects an end-surface thereof in a cutting-edge for coacting with the cutting-edge of the slider; and, a spiral-spring threaded upon the slider and contacting with the slider-bearing by one end and secured to the slider by the other end for causing the severing of the material by the cutting-edges.

In testimony whereof, I affix my signature in the presence of two witnesses.

GEORGE W. FOSTER.

Witnesses:
CHANNING WHITAKER,
IRVING D. KIMBALL.

Copies of this patent may be obtained for five cents each, by addressing the "Commissioner of Patents, Washington, D. C."